United States Patent [19]

Kapoor et al.

[11] Patent Number: 5,714,132
[45] Date of Patent: Feb. 3, 1998

[54] PRODUCTION OF HYDROGEN AND CARBON MONOXIDE FROM OXYFUEL FURNACE OFF-GAS

[75] Inventors: Akhilesh Kapoor, South Orange; Satish S. Tamhankar, Scotch Plains, both of N.J.; Ramachandran Krishnamurthy, Chestnut Ridge, N.Y.

[73] Assignee: The BOC Group, Inc., New Providence, N.J.

[21] Appl. No.: 533,810

[22] Filed: Sep. 26, 1995

Related U.S. Application Data

[63] Continuation-in-part of Ser. No. 116,622, Sep. 7, 1993, abandoned.

[51] Int. Cl.$^6$ .................. C01B 3/18; C01B 31/20; C01B 3/24; C01B 3/26
[52] U.S. Cl. .................. 423/418.2; 252/373; 423/437 R; 423/650; 423/652; 423/655; 423/656
[58] Field of Search .................. 423/437 R, 418.2, 423/648.1, 652, 655, 656, 650; 252/373

[56] References Cited

U.S. PATENT DOCUMENTS

| | | | |
|---|---|---|---|
| 3,418,082 | 12/1968 | Ter Haar | 423/418.2 |
| 3,912,502 | 10/1975 | Miyashita et al. | 75/42 |
| 3,964,882 | 6/1976 | Staudinger | 252/373 |
| 4,048,091 | 9/1977 | Barnaba | 252/373 |
| 4,854,943 | 8/1989 | Voeste et al. | 423/418.2 |
| 5,073,356 | 12/1991 | Guro et al. | 423/418.2 |
| 5,368,835 | 11/1994 | Choudhary et al. | 423/418.2 |

*Primary Examiner*—Wayne Langel
*Attorney, Agent, or Firm*—Coleman R. Reap; Salvatore P. Pace

[57] ABSTRACT

Hot exhaust gases from oxygen-based fossil fuel fired-furnaces made up predominantly of steam and carbon dioxide are used for reforming a hydrocarbonaceous substance in the presence or absence of oxygen to produce carbon monoxide and hydrogen. Additional hydrogen can be produced by subjecting the carbon monoxide produced in the reaction to the water gas shift reaction.

19 Claims, 3 Drawing Sheets

5,714,132

PRODUCTION OF HYDROGEN AND CARBON MONOXIDE FROM OXYFUEL FURNACE OFF-GAS

RELATED APPLICATION

This application is a continuation-in-part of application Ser. No. 08/116,622, filed Sep. 7, 1993, abandoned.

FIELD OF THE INVENTION

This invention relates to the production of hydrogen and carbon monoxide, and more particularly to the production of these gases by steam and/or carbon dioxide reforming of a high temperature waste gas stream from an oxyfuel fired furnace.

BACKGROUND OF THE INVENTION

Many industrial processes require the use of high temperature furnaces. For instance, certain inorganic products, such as glass and steel, are produced by heating a mineral charge to temperatures sufficiently high to melt the charge, which may be, for example, as high as 800° to 1700° C. or more. Traditionally, the heating step has been carded out by introducing the raw material charge into a specially designed furnace and directly heating the charge in the furnace by combusting a fossil fuel with air in the furnace. The combustion produces a very hot gas comprised predominantly of carbon dioxide, nitrogen and water vapor. Various means have been used to recover heat from the furnace combustion gas, but because of the high concentration of nitrogen in the gas stream, very little has been done to recover or make use of the carbon dioxide in the exhaust gas.

It was known that the use of substantially pure oxygen or oxygen-enriched streams as the oxidant in the above-described furnaces resulted not only in much hotter combustion gases per unit of fuel burned, but also in the complete elimination or drastic reduction of inert atmospheric gases, such as nitrogen and argon, in the furnace exhaust gas. However, because of the low cost of air as an oxidant and the nonexistence of high efficiency oxygen-based fuel burners, oxygen-based furnaces or oxyfuel furnaces, as they are more commonly referred to, were used only for special applications.

Recently, oxyfuel burners have been developed which are efficient enough to render the use of oxyfuel furnaces for the above-described glass, steel, etc., manufacturing processes competitive with air-based furnaces, and the use of oxyfuel furnaces for glass and steel manufacturing processes is more common. Furthermore, because the exhaust gas from these furnaces is comprised substantially of relatively pure carbon dioxide and water vapor, it is now more feasible to recover or make use of the carbon dioxide in the effluent gases from these furnaces.

U.S. Pat. No. 5,006,141, issued to Chen et al. on Apr. 9, 1991, discloses a process for the recovery of commercially pure carbon dioxide from a cooled glass-making furnace exhaust gas. Fuel in the furnace is combusted with oxygen-enriched oxidant. U.S. Pat. No. 5,057,133 discloses a process which utilizes waste heat from a glass-making furnace in which fuel is combusted by an oxygen-enriched oxidant. The waste gas stream is cooled and used to provide heat for a conventional hydrocarbon steam reformer that produces a syngas which is used as fuel for the glass-making furnace. The carbon dioxide from the system is sent to carbon dioxide recovery or to a stack. In one embodiment of the invention a portion of the cooled carbon dioxide produced in the process is used as a moderator for hydrocarbon/carbon dioxide reformation.

Applications which encourage removal of carbon dioxide from furnace exhaust gases are continuously sought because they help to minimize the "greenhouse effect" which, to a great extent, is caused by the vast quantities of carbon dioxide discharged into the environment. The present invention provides such an application, and also provides the additional advantage of using the heat content of carbon dioxide-rich oxyfuel furnace exhaust, thus reducing possible heat pollution of the environment.

SUMMARY OF THE INVENTION

The invention is a multi-step process for the production of hydrogen and carbon monoxide. The first step comprises burning a hydrocarbonaceous fuel in an oxyfuel-fired furnace using oxygen-enriched gas (defined below) as oxidant, thereby producing a gaseous product stream comprised predominantly of carbon dioxide and water vapor. The hot gaseous product stream is then introduced into a reformer wherein it is contacted with a hydrocarbon, or into a partial oxidation reactor wherein it is contacted with additional hydrocarbonaceous fuel and oxygen, thereby producing a gaseous effluent containing high concentrations of carbon monoxide and hydrogen and some carbon dioxide. Supplemental steam can be introduced into the reformer or partial oxidation reactor, if necessary.

In a preferred embodiment of the invention the gaseous effluent from the reformer or partial oxidation reactor is subjected to a purification step prior to product separation to remove undesired components, such as sulfur oxides and nitrogen oxides. In another preferred embodiment part or all of the gaseous effluent remaining after product separation, which usually contains carbon dioxide, and may contain water vapor, some hydrogen and carbon monoxide, and small amounts of unreacted fuel is recycled to the partial oxidation reactor or reformer.

In the embodiment of the invention in which the second step reaction is reforming the hydrocarbon is preferably natural gas or an alkane, more preferably an alkane having up to 4 carbon atoms, and most preferably methane. The reforming reaction is preferably carried out in the presence of a reforming catalyst, but, if desired, the reaction may be driven thermally. When a reforming catalyst that is sensitive to poisons, such as oxides of sulfur or nitrogen, is used these poisons are preferably removed from the furnace product gas stream prior to introduction of this stream into the reformer. In the most preferred aspect of this embodiment of the invention, the hydrocarbon feed to the reformer is heated prior to being introduced into the reformer.

In the embodiment of the invention in which the second step reaction is partial oxidation, part or all of the oxygen required for the partial oxidation reaction is introduced into the oxyfuel furnace as excess oxygen, or oxygen is introduced into the partial oxidation reactor in addition to the hot furnace gases and hydrocarbonaceous fuel. The partial oxidation reaction may be carried out thermally or catalytically. In a preferred aspect of this embodiment the efficiency of the partial oxidation reaction is increased by heating the hydrocarbonaceous fuel and oxygen prior to introduction of these streams into the partial oxidation reactor.

The gaseous effluent from the reformer or partial oxidation reactor can be subjected to a separation process to recover high purity hydrogen and high purity carbon monoxide, if it is desired to produce such products. Product separation can be accomplished by any suitable separation technique, such as by pressure swing adsorption. According to a preferred embodiment the separation is effected by subjecting the reactor effluent to a pressure swing adsorption process with an adsorbent which more strongly adsorbs carbon monoxide than hydrogen, thereby producing high purity carbon monoxide and a hydrogen-enriched stream, and then subjecting the hydrogen-enriched stream to a pressure swing adsorption process with an adsorbent which less strongly adsorbs hydrogen than other components present of said hydrogen-enriched stream, thereby producing high purity hydrogen. In an alternate embodiment the product separation is accomplished by subjecting the gaseous product to a pressure swing adsorption process, thereby producing high purity hydrogen and a carbon monoxide-enriched gas stream, and then subjecting the carbon monoxide-enriched gas stream to distillation, thereby producing high purity carbon monoxide.

In a preferred embodiment of the invention, part or all of the gaseous product remaining after separation of hydrogen and carbon monoxide from the gaseous reactor effluent product is recycled to the reformer or partial oxidation reactor. To enhance the efficiency of the process the recycle stream can be heated by indirect exchange with the hot effluent from the reactor. Also, in preferred embodiments the combustion in the furnace and the partial oxidation reactor is carried out with an oxygen-enriched gas containing at least 90% by volume oxygen, and in the most preferred embodiments of the invention it is carried out with an oxygen-enriched gas containing at least 98% by volume oxygen.

In a further modification of the process of the invention, the gaseous effluent from the reactor and additional steam, if necessary, is introduced into a water gas shift reactor packed with a suitable shift catalyst, thereby converting carbon monoxide in the effluent and the steam to carbon dioxide and additional hydrogen. If desired, hydrogen can be removed from the reactor effluent prior to the water gas shift reaction. The carbon dioxide and hydrogen can be recovered from the water gas shift reactor effluent as high purity hydrogen and high purity carbon dioxide by any suitable technique, such as by pressure swing adsorption.

The invention is particularly suitable for practice using effluent gas streams from high temperature furnaces, such as glass manufacturing furnaces, steel manufacturing furnaces, ceramic manufacturing furnaces and limekilns.

DETAILED DESCRIPTION OF THE INVENTION

Figure 1:
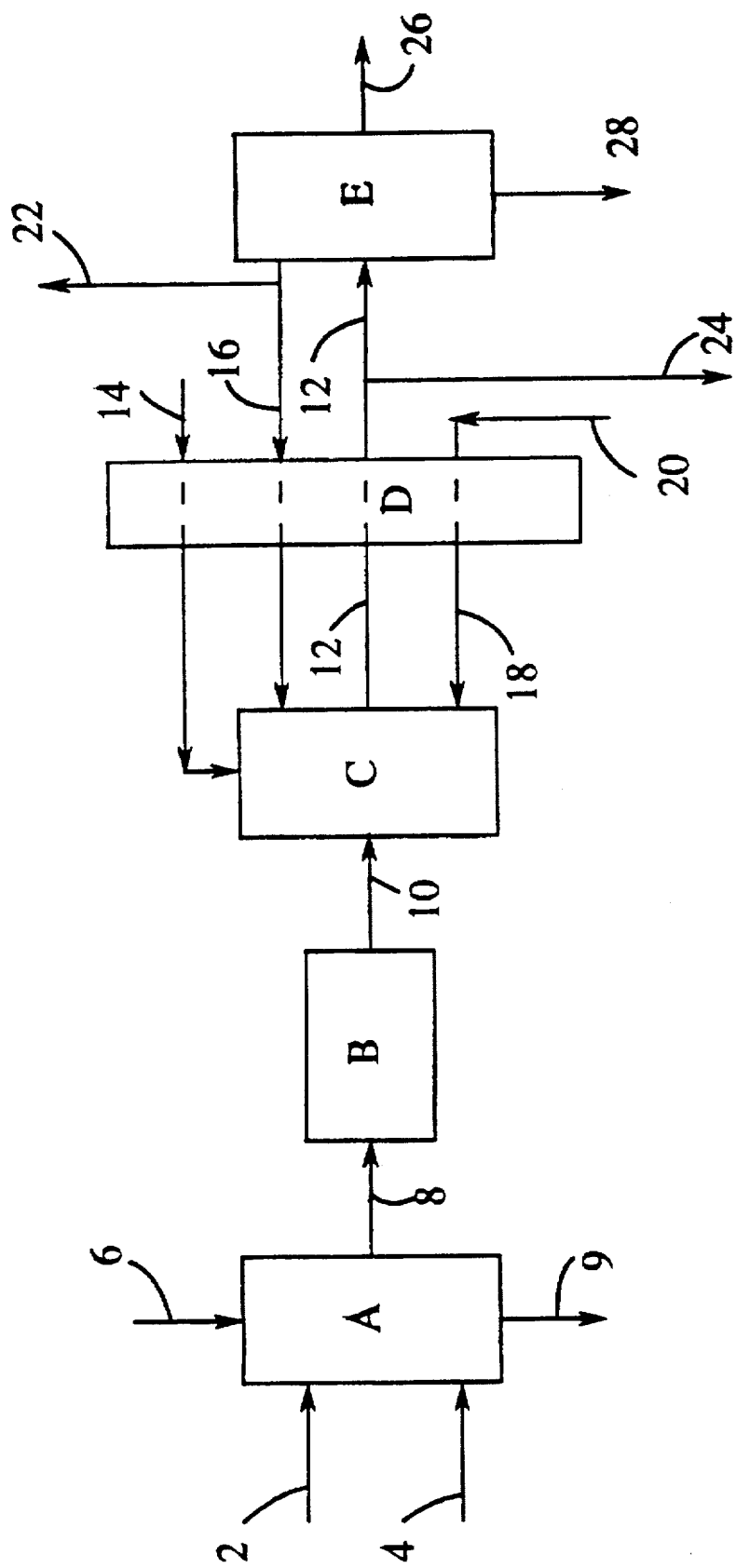
FIG. 1 is a schematic representation of a system for producing hydrogen and carbon monoxide from an oxyfuel furnace exhaust gas stream.

The term "hydrocarbonaceous fuel", as used in this specification, means a fuel comprised substantially of hydrocarbons. The hydrocarbonaceous fuel may be in the form of a solid, liquid or a gas. Preferred hydrocarbonaceous fuels are hydrocarbons that are liquid or gaseous at normal atmospheric conditions. Typical liquid hydrocarbons are the aliphatic hydrocarbons having 1 to 40 carbon atoms and aromatic hydrocarbons having 6 to 40 carbon atoms. Typical gaseous hydrocarbons are natural gas, which contains about 97% methane and the alkanes having up to 5 carbon atoms.

Also, as used herein the term "high purity hydrogen" means a gas containing at least 99 volume percent hydrogen; "oxygen-enriched gas" means oxygen or an oxygen-inert gas mixture containing at least 90 volume percent oxygen; and "high purity carbon monoxide" and "high purity carbon dioxide" mean, respectively, gases containing at least 98 volume percent carbon monoxide and carbon dioxide. By the term "inert gas" is meant a gas that is unreactive under the conditions present in the oxyfuel furnace. Inert gases include nitrogen, argon, carbon dioxide and mixtures of these.

In general, the invention provides a process for producing high purity hydrogen and carbon monoxide from a hot oxyfuel furnace exhaust gas stream comprised predominantly of carbon dioxide and water vapor. The exhaust gas stream is generated by combusting a hydrocarbonaceous fuel with oxygen-enriched gas at high temperatures, thereby producing hot exhaust gas comprised substantially of carbon dioxide and water vapor. The exhaust gas may additionally contain oxygen, small amount of carbon monoxide and impurity levels of other gases, such as sulfur dioxide. The exhaust gas exits the furnace at a temperature of at least about 525° C., and its temperature is generally in the range of about 525° to about 1000° C. The combustion is conducted under substantially full combustion conditions, i.e. substantially all of the carbon in the fuel is oxidized to carbon dioxide. The concentration of carbon monoxide in the furnace exhaust gas is in the range of 0 to about 2% by volume, based on the total volume of hot exhaust gas. Oxygen is introduced into the furnace at an amount in the range of the stoichiometric amount to 110% of the stoichiometric amount, based on the amount of fuel introduced into the furnace.

The hot exhaust gas, at a temperature in the range of about 525° to about 1000° C., along with additional hydrocarbonaceous fuel, is next introduced into a reactor which is either a reformer or a partial oxidation reactor, wherein the reactants are catalytically or thermally converted to hydrogen and carbon monoxide. When the reactor is a reformer, the reforming reaction is conducted in the absence of additional oxygen and usually in the presence of a reforming catalyst. On the other hand, when the reactor is a partial oxidation reactor additional heat is required, and it is provided by introducing oxygen and hydrocarbonaceous fuel into the reactor along with the furnace waste gas stream and combusting the hydrocarbonaceous fuel therein. Part or all of the oxygen needed for the partial oxidation reaction may be provided by supplying excess oxygen to the oxyfuel furnace. An advantage of this alternative is that the oxygen entering the partial oxidation reactor will be preheated in the oxyfuel furnace such that the furnace combustion will be more efficient.

The reactor product gas stream, comprised mostly of hydrogen and carbon monoxide can be used as is, for example as a synthesis gas, or it may be separated into high purity hydrogen and carbon monoxide. Alternatively, the reactor product gas, or the carbon monoxide contained therein, may be reacted in a water gas shift reactor to produce a mixture of hydrogen and carbon dioxide.

The invention can be better understood from the accompanying drawings, in which the same reference numeral is used to designate the same or similar equipment in the various figures. To simplify discussion of the invention auxiliary equipment not necessary for an understanding of the invention, including valves, compressors and heat exchangers, have been omitted from the drawings. The specific equipment units of the systems illustrated in the drawings are conventional and the details of their construction and operation form no part of the invention.

Considering first FIG. 1, the apparatus of the embodiment illustrated therein includes oxyfuel furnace A, purification unit B, reformer C, heat exchanger D and separator E. Oxyfuel furnace A can be any furnace that is suitable for combusting a hydrocarbonaceous fuel with oxygen-enriched gas. Suitable oxyfuel furnaces include those in which glass, steel, ceramics and lime are produced. Furnace A is equipped on its feed end with hydrocarbonaceous fuel and oxygen feed lines 2 and 4, respectively, and raw material charge port 6; and on its discharge end with furnace exhaust gas discharge line 8 and product discharge port 9. On its downstream end line 8 is connected to the inlet end of purification unit B, which is an optional unit in the equipment train. The outlet end of purification unit B is connected to the inlet end of reactor C via line 10.

In the embodiment illustrated in FIG. 1 reactor C is a reformer for converting a mixture of a hydrocarbon fuel, such as methane, carbon dioxide and steam to carbon monoxide and hydrogen. Reformer C may be a thermal reformer or a catalytic reformer. In the latter case reformer C is packed with a catalyst which catalyzes the reaction of carbon dioxide and steam with methane to produce carbon monoxide and hydrogen. Typical reforming catalysts include noble metals such as platinum, palladium, rhodium and mixtures of these or base metals, such as nickel supported on a refractory material. Alternatively, reformer C may be packed with a sulfur-resistant catalyst, such as sulfur-passivated nickel. Reformer C is supplied with hot furnace gas via line 10, if the system of FIG. 1 includes purification unit B, or directly from furnace A via line 8, if no purification unit is used in the system. Reformer C is also provided with a hydrocarbonaceous fuel feed line 14, recycle stream supply line 16 and supplemental steam supply line 18.

Located downstream of reformer C is optional heat exchanger D, which, when included in the system of FIG. 1, provides heat exchange between the hot gases exiting reformer C through line 12 and hydrocarbon feed entering the system through line 14, recycle gas returning to reformer C through line 16 and supplemental steam entering the system through line 18. If heat exchanger D is excluded from the system, hydrocarbon feed, recycle gas and steam can be directly introduced into reformer C through lines 14, 16 and 20, respectively. In the preferred embodiment of the invention heat exchanger D is included in the system and it is used to preheat the hydrocarbon feed and the recycle stream to reformer C, and to generate supplemental steam from water introduced thereinto through line 20.

Downstream from reformer C and heat exchanger D (if included in the system) is separator E. This unit is likewise optional and when present in the system of FIG. 1 is used to separate high purity hydrogen and carbon monoxide from the gaseous effluent from reformer C. Separator E can be any separation system that is effective for separating hydrogen and carbon monoxide in high purifies from the reformer effluent. This element can comprise single or multiple pressure swing or temperature swing adsorption systems or a combination of systems, such as a pressure swing adsorption system in combination with a cryogenic distillation system. A preferred separation system comprises serially connected pressure swing adsorption units, such as a first unit which more strongly adsorbs carbon monoxide than all other components of the feed stream to separator E and a second unit which less strongly adsorbs hydrogen than other components of the gas stream. An example of such a system is an arrangement comprising a first pressure swing adsorption unit packed with copper-exchanged zeolite serially connected to a second pressure swing adsorption unit packed with activated carbon and/or molecular sieve zeolite.

Alternatively, separator E can comprise a combination of a pressure swing adsorption unit adapted to separate nonadsorbed high purity hydrogen product from the gaseous reformer effluent and serially connected thereto a cryogenic distillation unit adapted to separate high purity carbon monoxide from the sorbate from the pressure swing adsorption unit.

In practicing the process of the invention in the system of FIG. 1, the raw materials that are to be processed in furnace A are charged into the furnace through line 6, and a hydrocarbonaceous fuel, preferably one that is substantially free of impurities that adversely affect the performance of any catalyst present in reformer C, is introduced into furnace A via line 2 and combusted therein with oxygen-enriched gas, introduced through line 4. During the combustion a hot exhaust gas is discharged from furnace A through line 8. When processing of the raw material is completed the product is removed from furnace A through port 9. If the furnace exhaust gas contains impurities that adversely affect catalyst present in reformer C, these are preferably removed by passing the gas through purifier B. Purifier B may be any gas purification system that removes impurities such as sulfur oxides and nitrogen oxides from gas streams at high temperatures. An example of a typical purification means is a system which contains a fluidized sand or lime bed. The purification step can, of course, be omitted if reformer C contains a catalyst that is not sensitive to any impurities present in the exhaust gas.

After leaving furnace A and purifier B, if a purifier is included in the system, the exhaust gas enters reformer C wherein it is contacted with preheated hydrocarbonaceous fuel, which is introduced into reformer C through line 14. In this embodiment of the invention it is preferred to use an alkane having up to 4 carbon atoms, and most preferred to use methane or natural gas as fuel. In some cases the gases exiting the furnace are hotter than the temperature at which it is desired to conduct the reforming reaction. In such cases the hot furnace gases can be cooled to the desired reformation temperature. If it is desired additional steam can be introduced into reformer C through line 18. Also, if the system of FIG. 1 is operated with product separator E in service, part or all of the residual gas remaining after separation of high purity hydrogen and carbon monoxide can be recycled to the reformer through line 16. Alternatively, all or part of the residual gas stream from separator E may be discharged from the system through line 22 for use or disposal outside of the system. The reactions occurring in reformer C are:

$$CH_4 + H_2O \rightleftharpoons CO + 3H_2 \qquad (1)$$

$$CH_4 + CO_2 \rightleftharpoons 2CO + 2H_2 \qquad (2)$$

As can be seen from these reactions methane reacts with both steam and carbon dioxide to produce carbon monoxide and hydrogen.

Figure 2:
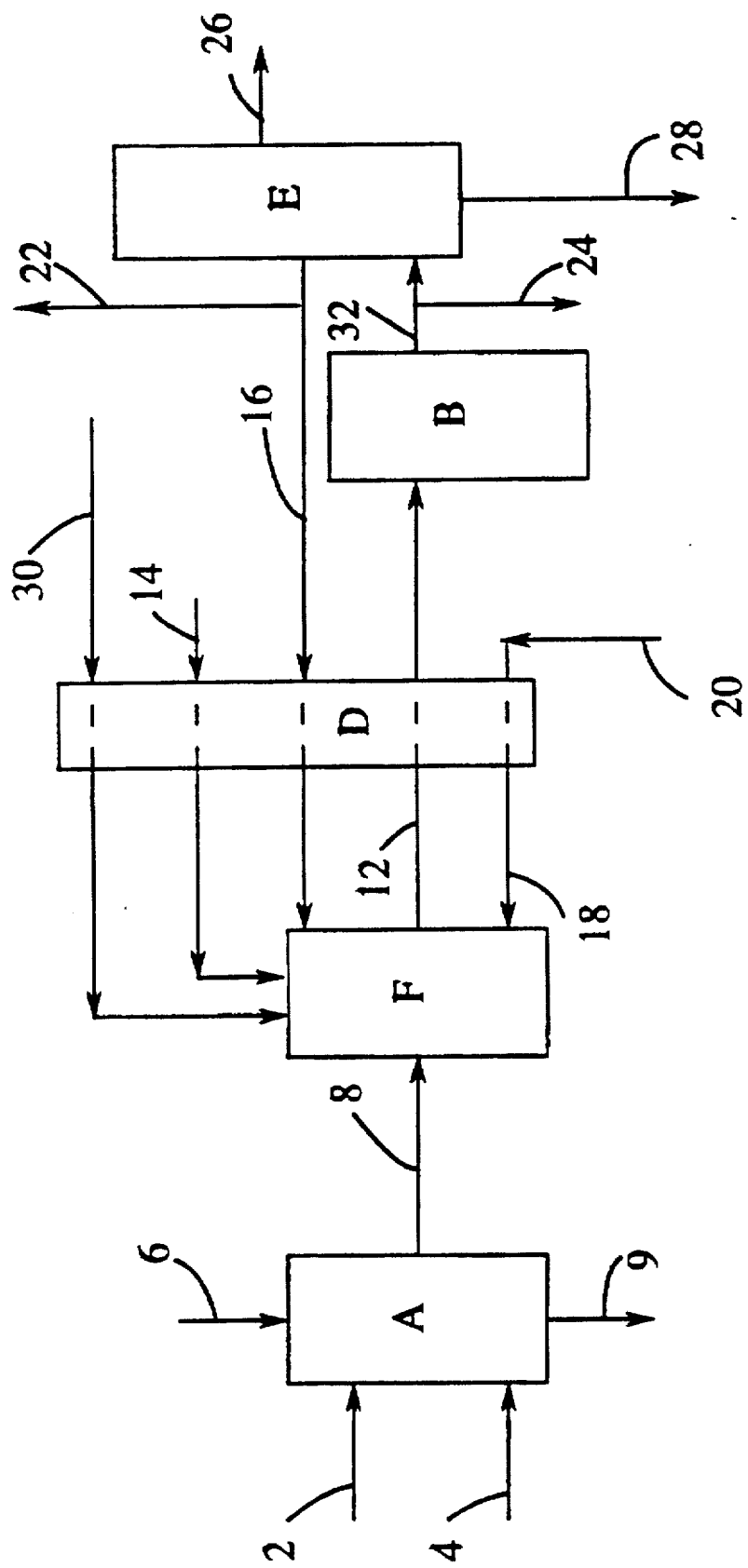
FIG. 2 is a schematic representation of an alternate embodiment of the system of FIG. 1.

The hot exhaust hydrogen- and carbon monoxide-enriched gas from reformer C passes through heat exchanger D via line 12. The exhaust gas is cooled in exchanger D by heat exchange with streams passing through lines 14, 16 and 18. The cooled exhaust gas can be discharged from the system through line 24, if it is desired to use the product as is, or it can be introduced into separator E for recovery of high purity hydrogen and carbon monoxide. Hydrogen and carbon monoxide streams are removed from the system through lines 26 and 28, respectively. The system illustrated in FIG. 2 is the same as the system of FIG. 1, except that the system of FIG. 2 includes partial oxidation reactor F, rather than reformer C, and purifier B is positioned downstream of partial oxidation reactor F and heat exchanger D. Partial oxidation reactor F is provided with hydrocarbonaceous fuel feed line 14, recycle line 16 and supplemental steam line 18, as is reformer C of FIG. 1. Reactor F is additionally provided with oxygen-enriched gas supply line 30. Located downstream of heat exchanger D is optional purifier B, which is adapted to remove impurities such as oxides of nitrogen and sulfur, from the cooled exhaust gas exiting heat exchanger D through line 12. Line 32 connects purifier B with separator E.

In practicing the process of the invention in the system of FIG. 2 hot furnace exhaust gas enters reactor F via line 8. The reactions occurring in reactor F are:

$$CH_4 + H_2O \rightleftharpoons CO + 3H_2 \quad (1)$$

$$CH_4 + CO_2 \rightleftharpoons 2CO + 2H_2 \quad (2)$$

$$2CH_4 + 3O_2 \rightarrow 2CO + 4H_2O \quad (3)$$

$$CH_4 + 2O_2 \rightarrow CO_2 + 2H_2O \quad (4)$$

The partial oxidation reaction in reactor F can be catalytic, but is preferably thermal. Carbon monoxide and hydrogen are produced in reactor F by the occurrence of reactions (1) and (2) therein. Water vapor and additional carbon monoxide are produced by the occurrence of reaction (3) and carbon dioxide and water vapor are produced by the occurrence of reaction (4). The carbon dioxide and water vapor produced in reactions (3) and (4) react with methane to produce additional carbon monoxide and hydrogen. The combustion of methane with the oxygen entering reactor F through line 30 provides the additional heat required for endothermic reactions (1) and (2). When the partial oxidation reaction is thermal no catalyst is present in reactor F. In this case purifier B can be positioned downstream of heat exchanger D, so that cooling of the hot exhaust gas entering reactor F is minimized. The hydrocarbonaceous fuel entering reactor F through line 14 can be the same hydrocarbonaceous fuel that is combusted in furnace F or, if desired, a different hydrocarbonaceous fuel can be used.

Figure 3:
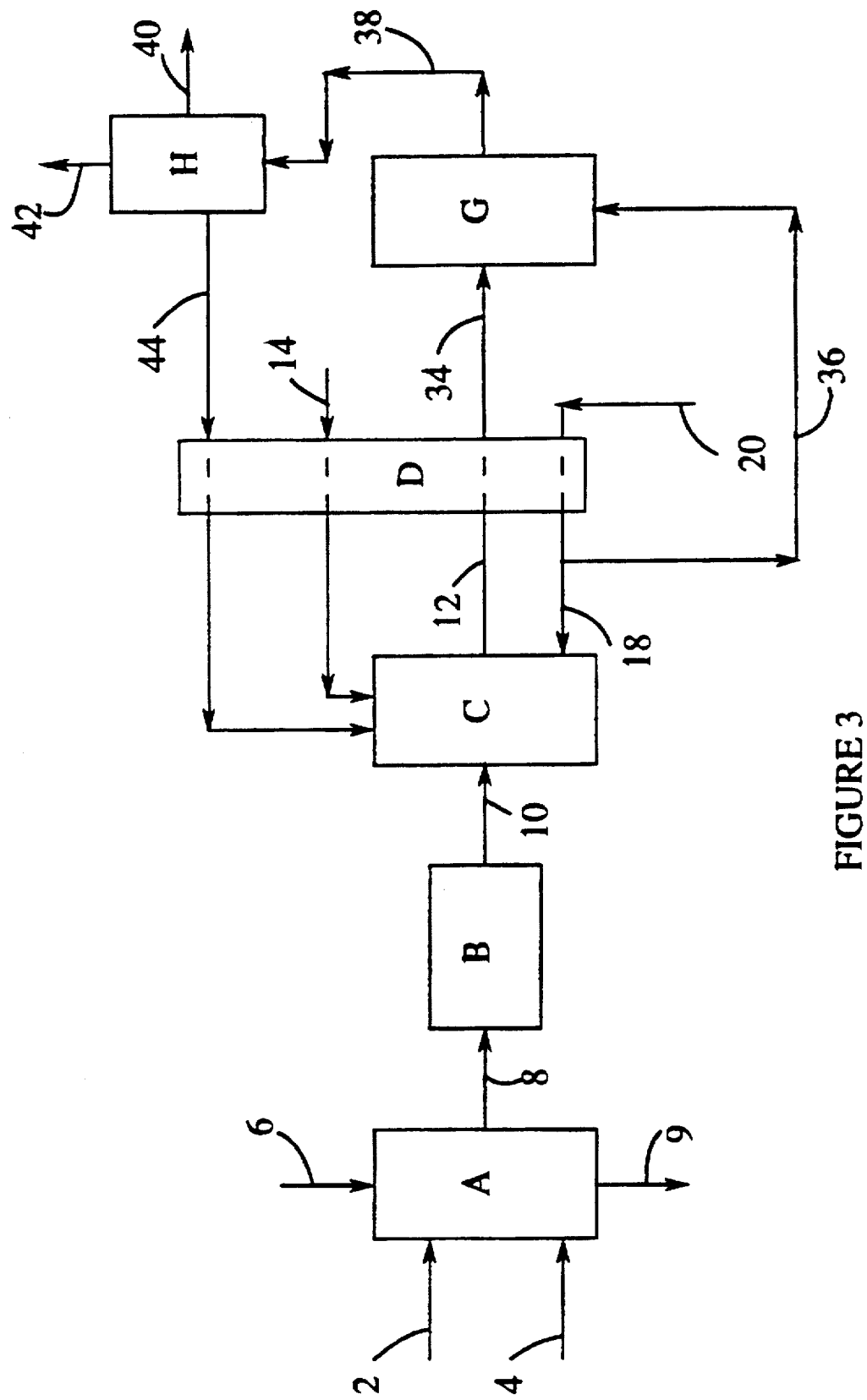
FIG. 3 is a schematic representation of a modified version of the system of FIG. 1, adapted to the production of hydrogen and carbon dioxide.

The system of FIG. 3 is the system of FIG. 1, modified to produce additional hydrogen and provide for the conversion of carbon monoxide to carbon dioxide via the water gas shift reaction. This modification could be applied equally well to the systems of FIGS. 1 and 2, but for purposes of illustration it is applied only to the system of FIG. 1. In the system of FIG. 3 unit G is a shift reactor and unit H is a carbon dioxide-hydrogen separator. Reactor G, packed with a water gas catalyst, such as copper/zinc oxide or iron, is provided with carbon monoxide-rich gas through line 34 and, if desired, additional steam through line 36. On its discharge end reactor G is in fluid communication with separator H through line 38. Separator H can be any commercially available means for separating carbon dioxide and hydrogen, but is preferably a pressure swing adsorption unit packed with an adsorbent that more strongly adsorbs carbon dioxide than other components of the gas stream entering this unit. Suitable adsorbents include activated carbon and zeolites. The particular adsorbent used in separator H is not critical and forms no part of the invention. In a preferred embodiment separator H is a multiple bed adsorption system adapted to separate high purity hydrogen and carbon dioxide, and to provide a residual product containing hydrogen, carbon dioxide and unreacted carbon monoxide. In the embodiment illustrated in FIG. 3 separator H is provided with hydrogen product recovery line 40, carbon dioxide product line 42 and residual product recycle line 44. In operation, units A, B and C perform the same functions as they performed in the system of FIG. 1. Unit D performs similarly in the systems of FIGS. 1 and 3, however the composition of stream 44 of FIG. 3 may differ in composition from the composition of stream 16 of FIG. 1. Exhaust gas and steam entering reactor G through lines 34 and 36, respectively contact the catalyst bed in the reactor and react to form carbon dioxide and hydrogen. The product gas mixture leaves reactor G through line 38 and next enters separator H wherein its components are separated as described above.

The invention is further illustrated by the following hypothetical examples wherein, unless otherwise indicated, parts, percentages and ratios are on a volume basis.

EXAMPLE I

This hypothetical example is representative of processes that can be carried out in the system of FIG. 1. Methane is combusted in an oxyfuel glass furnace using a stoichiometric amount of high purity oxygen as the oxidant. A furnace exhaust comprising steam and carbon dioxide is discharged from the reactor at a temperature of about 1700° C. The furnace exhaust gas stream is passed through a lime bed to remove sulfur oxides and the purified stream is mixed with additional methane and introduced into a catalytic reformer containing a nickel-based reforming catalyst. The additional methane is heated to about 500° C. by heat exchange with the hot exhaust gas from the reformer. The reformed gases exit the reformer at a temperature of about 725° C. and are further cooled to about 25° C. by heat exchange with cold water, thereby condensing 44.69 Kmol/hr (kilomoles per hour) of water from the effluent. The material balance for the process is recorded in Table I. In Table I stream 1 is the oxygen stream to the glass furnace, stream 2 is the furnace exhaust gas, stream 3 is the additional methane feed to the reformer, stream 4 is the reformed product stream, and stream 5 is the cooled product from the reformer.

TABLE I

| | STREAM | | | | |
|---|---|---|---|---|---|
| | 1 | 2 | 3 | 4 | 5 |
| Flow Rate (kmol/hr) | — | 100 | 20 | 159.7 | 115.1 |
| % $O_2$ | 95.00 | — | — | — | — |
| % $H_2O$ | — | 64.41 | — | 30.19 | 3.14 |
| % $CH_4$ | — | — | 100.00 | 0.09 | 0.12 |
| % $H_2$ | — | — | — | 35.00 | 48.57 |
| % $CO_2$ | — | 32.21 | — | 17.87 | 24.80 |
| % CO | — | — | — | 14.72 | 20.43 |
| % Inerts ($N_2$ + Ar) | 5.00 | 3.38 | — | 2.12 | 2.94 |

EXAMPLE II

This hypothetical example is representative of processes that can be carried out in the system of FIG. 2. Methane is combusted in an oxyfuel glass furnace using 110% of the stoichiometric amount of high purity oxygen required for complete combustion of the methane fuel in the oxyfuel furnace. A furnace exhaust comprising steam, carbon dioxide and unreacted oxygen is discharged from the reactor at a temperature of about 1700° C. The hot furnace exhaust gas is mixed with additional methane that has been heated to about 500° C. by heat exchange with the hot exhaust gas from a partial oxidation reactor located downstream of the oxyfuel furnace, and the gas mixture enters the partial oxidation reactor at a temperature of about 1327° C. The effluent from the partial oxidation reactor is at a temperature of about 789° C. The reactor effluent is further cooled to about 25° C. by heat exchange with cold water, thereby condensing 43.04 Kmol/Hr. of water from the stream.

The material balance for the process is tabulated in Table II. In Table II stream 1 is the oxygen stream to the glass furnace, stream 2 is the furnace exhaust gas, stream 3 is the additional methane feed to the partial oxidation reactor, stream 4 is the partial oxidation product stream, and stream 5 is the cooled partial oxidation product stream.

TABLE II

| | STREAM | | | | |
|---|---|---|---|---|---|
| | 1 | 2 | 3 | 4 | 5 |
| Flow Rate (kmol/hr) | — | 100 | 30 | 183.83 | 140.78 |
| % $O_2$ | 95.00 | 6.03 | — | — | — |
| % $H_2O$ | — | 60.31 | — | 25.82 | 3.14 |
| % $CH_4$ | — | — | 100.00 | 0.04 | 0.05 |
| % $H_2$ | — | — | — | 39.55 | 51.64 |
| % $CO_2$ | — | 30.15 | — | 13.67 | 17.85 |
| % CO | — | — | — | 19.02 | 24.83 |
| % Inerts ($N_2$ + Ar) | 5.00 | 3.51 | — | 1.91 | 2.49 |

The above examples illustrate the use of the process of the invention to manufacture a gas product stream with significant concentrations of hydrogen and carbon monoxide.

Although the invention has been described with particular reference to specific examples, the examples merely depict selected embodiments of the invention and are not intended to limit the scope of the invention. Variations of the disclosed embodiments are contemplated. For instance, the reactions in reactors C and F can be carried out using a hot gas from any source, provided that it comprises substantially carbon dioxide and water vapor. As explained above, the essential reactions are those carried out in furnace A and reactors C and F, but the invention is not limited to the series of reactions described above. The process of the invention is useful for the production of a variety of gas products. Furthermore, other catalysts and adsorbents and other means of gas separation can be used in the invention, if desired. The scope of the invention is limited only by the breadth of the appended claims.

What is claimed is:

1. A process for producing hydrogen and carbon monoxide comprising the steps:

(a) producing a hot gas mixture comprised substantially of carbon dioxide and steam and containing 0 to about 2% by volume carbon monoxide, said hot gas mixture being at a temperature of at least 1000° C., by combusting hydrocarbon fuel with oxygen-enriched gas in a high temperature furnace, the oxygen being present in an amount in the range of the stoichiometric amount to about 110% by volume of the stoichiometric amount; and (b) producing a gaseous product enriched in hydrogen and carbon monoxide by contacting at least part of said hot gas mixture with hydrocarbonaceous substance in a reactor at a temperature and pressure sufficiently high to cause the hydrocarbonaceous substance to react with the carbon dioxide and steam.

2. The process of claim 1, wherein said reactor is a reformer and said hydrocarbonaceous substance is natural gas or an alkane having 1 to 4 carbon atoms.

3. The process of claim 2, wherein said hydrocarbonaceous substance is methane.

4. The process of claim 2, wherein step (b) is conducted in the presence of a reforming catalyst.

5. The process of claim 4, wherein said gas mixture is subjected to one or more purification steps to remove sulfur oxides and/or nitrogen oxides therefrom prior to step (b).

6. The process of claim 4, wherein said catalyst is a sulfur resistant catalyst.

7. The process of claim 1, wherein said reactor is a partial oxidation reactor and step (b) is conducted in the presence of oxygen-enriched gas.

8. The process of claim 1, additionally comprising introducing supplemental steam into said reactor during step (b).

9. The process of claim 8, wherein said supplemental steam is produced by heat exchanging water with said gaseous product.

10. The process of claim 1, further comprising removing hydrogen and carbon monoxide from said gaseous product.

11. The process of claim 10, further comprising recycling to said reactor at least part of the gaseous product remaining after hydrogen and carbon monoxide removal.

12. The process of claim 10, wherein at least part of the hydrogen and carbon monoxide removal step is carried out by pressure swing adsorption.

13. The process of claim 12, wherein the hydrogen and carbon monoxide removal step is carried out by:

producing high purity carbon monoxide and a hydrogen-enriched stream by subjecting the gaseous product to a pressure swing adsorption process with an adsorbent which more strongly adsorbs carbon monoxide than hydrogen, and producing high purity hydrogen by subjecting said hydrogen-enriched stream to a pressure swing adsorption process with an adsorbent which less strongly adsorbs hydrogen than other components present in said hydrogen-enriched stream.

14. The process of claim 13, wherein the hydrogen and carbon monoxide removal step is carried out by:

producing high purity hydrogen and a carbon monoxide-enriched gas stream by subjecting the gaseous product to a pressure swing adsorption process, and producing high purity carbon monoxide by subjecting said carbon monoxide-enriched gas stream to distillation.

15. The process of claim 1, wherein said furnace is a glass manufacturing furnace, a steel manufacturing furnace, a ceramic manufacturing furnace or a lime kiln.

16. The process of claim 4, wherein the hydrocarbon fuel feed to said reformer is heated by indirect heat exchange with said gaseous product prior to being introduced into said reformer.

17. The process of claim 7, wherein the hydrocarbon fuel and oxygen-enriched gas feeds to said partial oxidation reactor are heated by indirect heat exchange with said gaseous product prior to being introduced into said partial oxidation reactor.

18. The process of claim 1, further comprising producing additional hydrogen and converting carbon monoxide in said gaseous product to carbon dioxide by contacting said gaseous product with a water gas shift catalyst in the presence of steam.

19. The process of claim 18, wherein high purity hydrogen and high purity carbon dioxide are produced by subjecting the effluent from the water gas shift reaction to a pressure swing adsorption process.

* * * * *